United States Patent
Feller et al.

(10) Patent No.: US 8,760,789 B2
(45) Date of Patent: Jun. 24, 2014

(54) ADAPTIVE CORRECTION OF SYMMETRICAL AND ASYMMETRICAL SATURATION IN MAGNETIC RECORDING DEVICES

(75) Inventors: Marc Feller, Long Beach, CA (US); Jaewook Lee, Irvine, CA (US); Umang Mehta, Tustin, CA (US)

(73) Assignee: Quantum Corporation, San Jose, CA (US)

( * ) Notice: Subject to any disclaimer, the term of this patent is extended or adjusted under 35 U.S.C. 154(b) by 285 days.

(21) Appl. No.: 13/240,745

(22) Filed: Sep. 22, 2011

(65) Prior Publication Data
US 2013/0077187 A1    Mar. 28, 2013

(51) Int. Cl.
*G11B 5/035*    (2006.01)

(52) U.S. Cl.
USPC .................. 360/65; 360/39; 360/46; 360/67; 360/68

(58) Field of Classification Search
None
See application file for complete search history.

(56) References Cited

U.S. PATENT DOCUMENTS

| | | | | |
|---|---|---|---|---|
| 6,043,943 A * | 3/2000 | Rezzi et al. | | 360/46 |
| 6,587,292 B1 * | 7/2003 | Ashley et al. | | 360/39 |
| 6,757,863 B2 * | 6/2004 | Kaneshige et al. | | 714/775 |
| 6,788,485 B2 * | 9/2004 | Ashley et al. | | 360/51 |
| 6,977,970 B2 * | 12/2005 | Shim et al. | | 375/317 |
| 7,239,203 B2 * | 7/2007 | Shanbhag | | 330/149 |
| 7,495,854 B2 * | 2/2009 | Hutchins et al. | | 360/46 |
| 7,710,673 B2 * | 5/2010 | Nakagawa et al. | | 360/39 |
| 8,300,758 B2 * | 10/2012 | Feller | | 375/371 |
| 8,433,965 B2 * | 4/2013 | Feller | | 714/746 |
| 2004/0071206 A1 * | 4/2004 | Takatsu | | 375/232 |
| 2006/0023780 A1 * | 2/2006 | Jibry | | 375/232 |
| 2008/0001797 A1 * | 1/2008 | Aziz et al. | | 341/118 |
| 2008/0187038 A1 * | 8/2008 | Currivan et al. | | 375/233 |
| 2009/0195906 A1 * | 8/2009 | Feller | | 360/65 |
| 2009/0276670 A1 * | 11/2009 | Hasegawa et al. | | 714/746 |
| 2013/0058391 A1 * | 3/2013 | Hou | | 375/232 |

* cited by examiner

*Primary Examiner* — Dismery Mercedes
(74) *Attorney, Agent, or Firm* — Baker Botts L.L.P.

(57) ABSTRACT

In one embodiment, a read channel comprises: a preprocessor for receiving a first signal and producing a second signal from the first signal using current values of a positive coefficient, a zero coefficient, and a negative coefficient; an interpolator for producing a third signal based on the second signal; and a slicer for producing a fourth signal from the third signal by estimating a level for the third signal. The fourth signal is at one of three levels consisting of a positive level, a zero level, and a negative level. For every n first signals received by the preprocessor, the current value of one of the positive coefficient, the zero coefficient, and the negative coefficient is adjusted depending on which of the three levels the fourth signal is at.

15 Claims, 7 Drawing Sheets

ADAPTIVE CORRECTION OF SYMMETRICAL AND ASYMMETRICAL SATURATION IN MAGNETIC RECORDING DEVICES

TECHNICAL FIELD

This disclosure generally relates to a compensator for correcting both symmetrical and asymmetrical saturation, such as in magnetic recording devices.

BACKGROUND

Magnetic recording, also known as magnetic storage, refers to the storage of data on a magnetized medium. Many contemporary magnetic recording systems employ magneto-resistive (e.g., MR (magnetoresistance), AMR (anisotropic magnetoresistance), or GMR (giant magnetoresistance)) read heads to detect the signals on the recording media. Such read heads introduce symmetrical and asymmetrical saturation into the signals, which tends to reduce the signal-to-noise ratio (SNR) entering the read channels.

SUMMARY

This disclosure generally relates to a compensator for correcting both symmetrical and asymmetrical saturation, such as in magnetic recording devices.

In particular embodiments, a read channel comprises: a preprocessor for receiving a first signal and producing a second signal from the first signal using current values of a positive coefficient, a zero coefficient, and a negative coefficient; an interpolator for producing a third signal based on the second signal; and a slicer for producing a fourth signal from the third signal by estimating a level for the third signal. The fourth signal is at one of three levels consisting of a positive level, a zero level, and a negative level. For every n first signals received by the preprocessor, the current value of one of the positive coefficient, the zero coefficient, and the negative coefficient is adjusted depending on which of the three levels the fourth signal is at.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A magneto-resistive read head employed in a magnetic recording system for detecting the signals on the recording media tends to introduce symmetrical and asymmetrical saturation into the signals. This often reduces the signal-to-noise ratio (SNR) entering the read channel. Theoretically, in ideal situations, each signal detected on the recording media should be at one of three possible levels: a positive level, also referred to as the "+1" or "1" level; a neutral level, also referred to as the "0" level; and a negative level, also referred to as the "−1" level. The three levels may each be assigned a signal value. For example, the "+1" level may be assigned signal value "+100"; the "0" level may be assigned signal value "0"; and the "−1" level may be assigned signal value "−100". In this case, a signal having a value of approximately 100 is considered to be at the "+1" level; a signal having a value of approximately 0 is considered to be at the "0" level; and a signal having a value of approximately −100 is considered to be at the "−1" level.

In practice, however, due to noise and other problems in the system, signals detected from the recording media sometimes have actual values that are not very close to the three values respectively assigned to the three levels. Symmetrical and asymmetrical saturation stretch the signals away from their supposed values. In the case of the symmetrical saturation, positive signals are stretched more positively, and negative signals are stretched more negatively. For example, a positive signal supposedly having a value of 95 may be stretched up to 115 (i.e., the positive signal value is further increased), and a negative signal supposedly having a value of −95 may be stretched down to −120 (i.e., the negative signal value is further decreased). In the case of the asymmetrical saturation, both positive and negative signals are stretched either more positively or more negatively. For example, if the asymmetrical saturation moves the signal values up in the positive direction, then a positive signal supposedly having a value of 95 may be stretched up to 115, while a negative signal supposedly having a value of −95 may be stretched up to −70. Conversely, if the asymmetrical saturation moves the signal values down in the negative direction, then a positive signal supposedly having a value of 95 may be stretched down to 70, while a negative signal supposedly having a value of −95 may be stretched down to −125.

Consequently, some form of correction is usually employed in a magnetic recording system to reduce the asymmetrical saturation. One way to reduce the asymmetrical saturation is employing a correction unit, which produces the effect of:

$$\gamma_o = \gamma_i + \alpha(\gamma_i + \lambda)^2 + \delta; \tag{1}$$

where: "$\gamma_i$" is the input to the correction unit; "$\alpha$" is an asymmetry correction term; "$\lambda$" is a harmonic offset; "$\delta$" is a path offset; and "$\gamma_o$" is the output from the correction unit. The "$\alpha$", "$\lambda$", "$\delta$" terms may be fixed at point of manufacture or adjusted throughout the product life.

However, such a correction unit only compensates for the asymmetrical saturation, and the symmetrical saturation still remains, leading to substandard performance of the magnetic recording system. Further, the read head and recording media are subject to various forms of degradation, such as head wear, media wear, head-media separation, and pole-tip recession (PTR), which may degrade channel SNR further over the product life.

In particular embodiments, a correction unit reduces both symmetrical and asymmetrical saturation in a magnetic recording system. This correction unit produces the effect of:

$$\gamma_o = \gamma_i + \alpha(\gamma_i)^2 + \beta(\gamma_i)^2|\gamma_i| + \delta; \quad (2)$$

where, again: "$\gamma_i$" is the input to the correction unit; "$\alpha$" is the asymmetry correction term; "$\delta$" is the path offset; and "$\gamma_o$" is the output from the correction unit. In addition, "$\beta$" is a symmetry correction term. Comparing EQUATION (2) to EQUATION (1), the harmonic offset, "$\lambda$", is omitted, and the symmetry correction term, "$\beta$", is added.

With EQUATION (2), a positive "$\alpha$" value stretches the positive side of the signal waveform and compresses the negative side of the signal waveform, and a negative "$\alpha$" value does the reverse (i.e., stretches the negative side of the signal waveform and compresses the positive side of the signal waveform). Thus the "$\alpha$" term corrects for the asymmetrical saturation. The "$\beta$" term is always positive (i.e., always has a positive value) and stretches both the positive and the negative sides of the signal waveform, thus correcting for the symmetrical saturation. The "$\delta$" term moves the entire signal waveform up or down (i.e., more positive or more negative) without affecting the separation between levels. The objective of the correction unit according to EQUATION (2) is to keep the SNR in the read channel as high as possible, and thus accurately detecting which one of the three levels each signal should be at.

Figure 1:
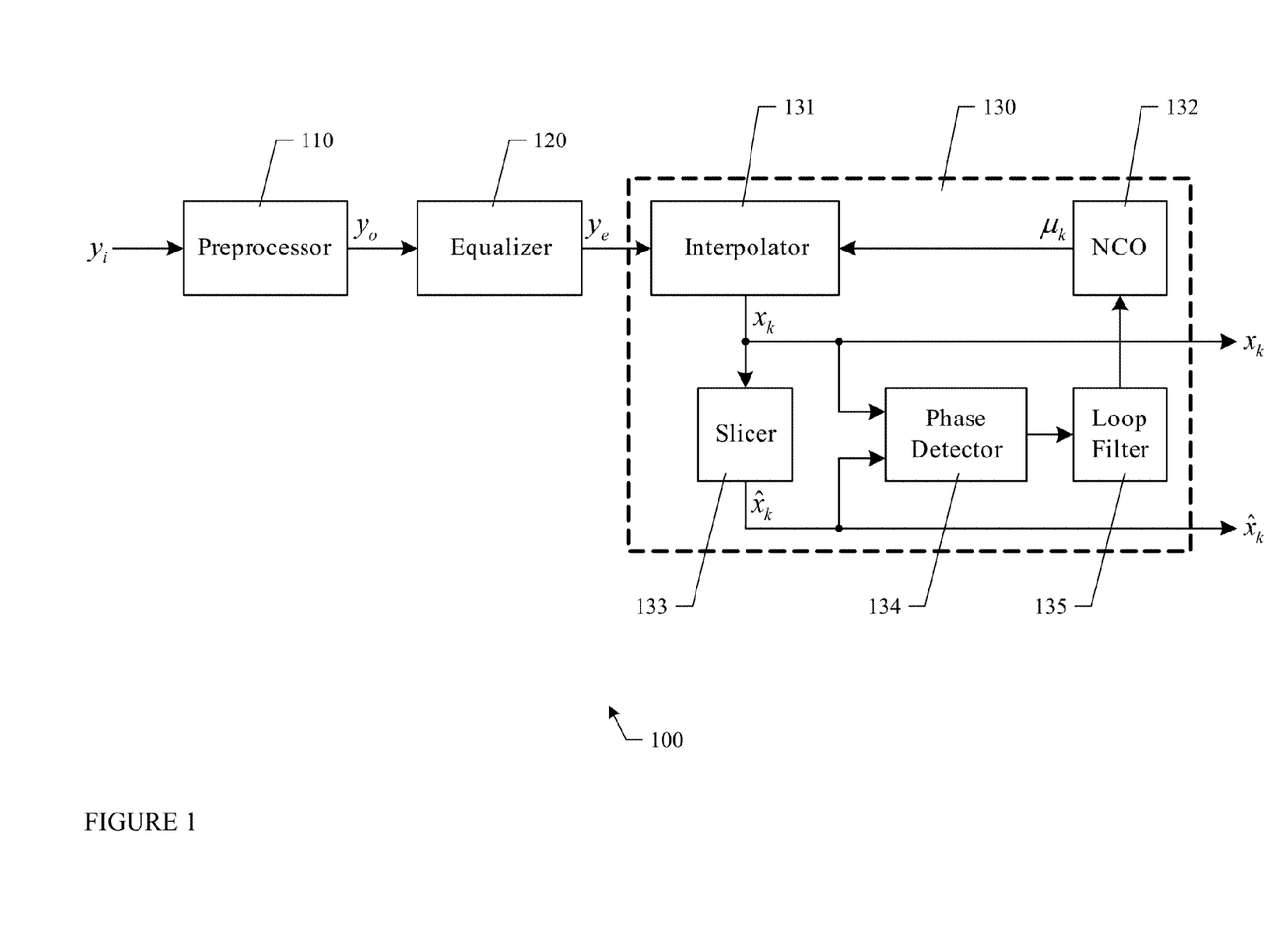
FIG. 1 illustrates an example read channel with a fixed preprocessor.

FIG. 1 illustrates a portion of an example read channel 100 typically employed in a magnetic recording device. Read channel 100 is driven by a sampling unit (not shown), which converts a continuous signal from the recording media into a sequence of discrete samples "$\gamma_i$". In particular embodiments, read channel 100 consists of an interpolated timing recovery unit 130 (marked by dashed lines), which is driven by a fixed preprocessor 110 and an equalizer 120. Interpolated timing recovery unit 130 consists of an interpolator 131, a numerically-controlled oscillator (NCO) 132, a slicer 133, a phase detector 134, and a loop filter 135.

In some implementations, fixed preprocessor 110 contains the circuitry corresponding to EQUATION (1). The samples "$\gamma_i$", which are distorted by noise, are linearized by preprocessor 110 to produce output "$\gamma_o$". In some implementations, "$\gamma_i$" is linearized according to EQUATION (1).

Figure 2:
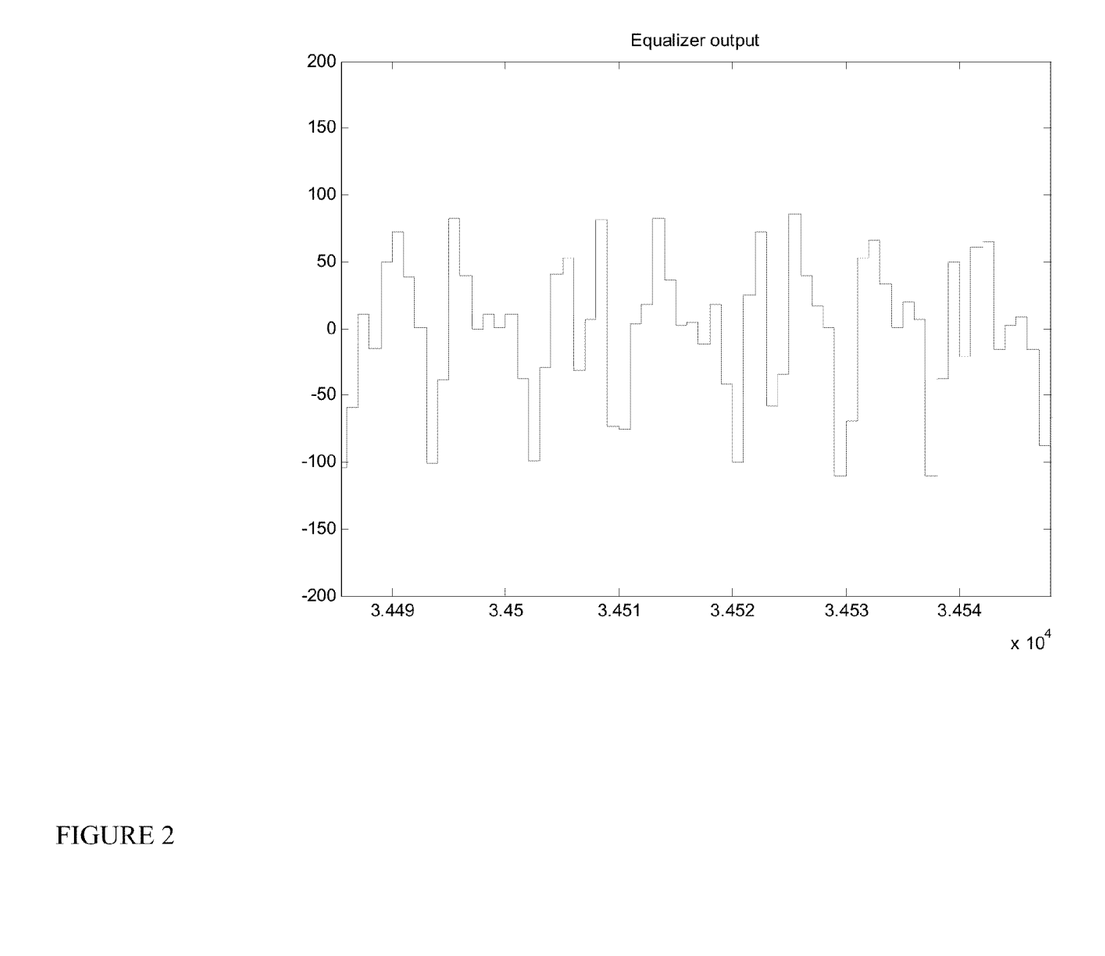
FIG. 2 illustrates an example equalizer output.

Equalizer 120 serves to boost the distorted incoming signal "$\gamma_o$" to transform it into a suitably good approximation of the target waveform "$\gamma_e$". FIG. 2 illustrates an example equalizer output. The samples are not confined to specific values but may occupy any values within the range of the discrete waveform. For example, if the source data range from $-128, -127, \ldots, -1, 0, +1, \ldots, +127$, a given sample may have any of these values.

Figure 3:
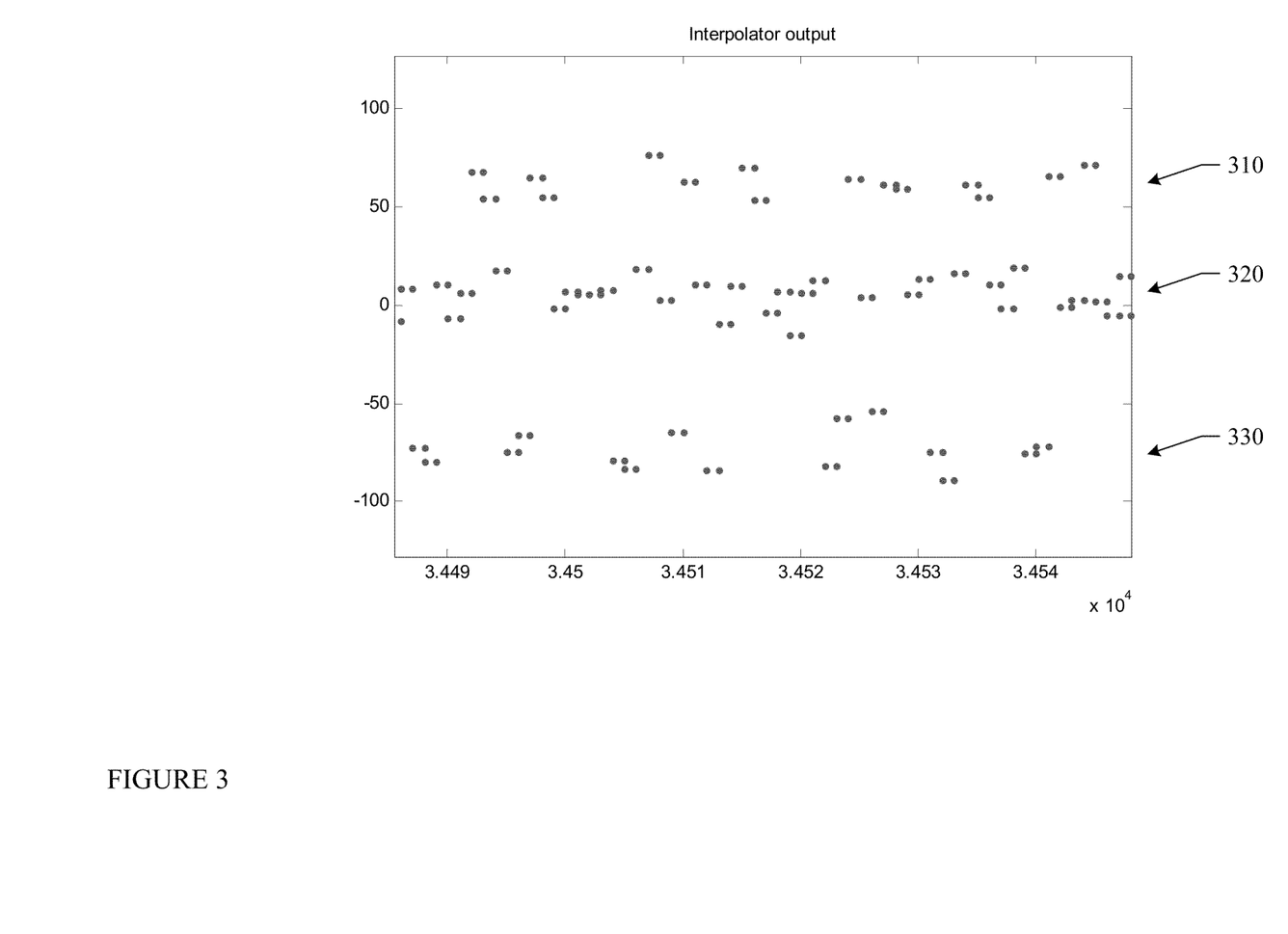
FIG. 3 illustrates an example interpolator output.

It is the function of interpolator 131 to separate the equalizer output "$\gamma_e$" into a small number of groups by interpolating between individual samples. This may be done on the basis of an offset "$\mu_k$" received from NCO 132, as illustrated in FIG. 1, or by other means such as an $N^{th}$-order Farrow Structure or a 4X Up-sampler. FIG. 3 illustrates the result of interpolating the samples of FIG. 2 and shows that interpolator output "$\chi_k$" has been separated into three groups, including positive values 310, values near zero 320, and negative values 330, forming what is commonly known as a PR4 waveform.

Because the source data are corrupted by noise, the samples "$\chi_k$" are not confined to fixed values. Instead, they are randomly distributed about such values as shown in FIG. 3. It is therefore necessary to estimate the level of each sample. This is the function of slicer 133, also known as a memoryless detector. If the current sample is substantially larger than zero, slicer 133 estimates that it has a positive level. If the current sample is substantially less than zero, slicer 133 estimates that it has a negative level. Otherwise (e.g., the current sample is somewhat near zero), slicer 133 estimates that the level of the current sample is zero.

Figure 4:
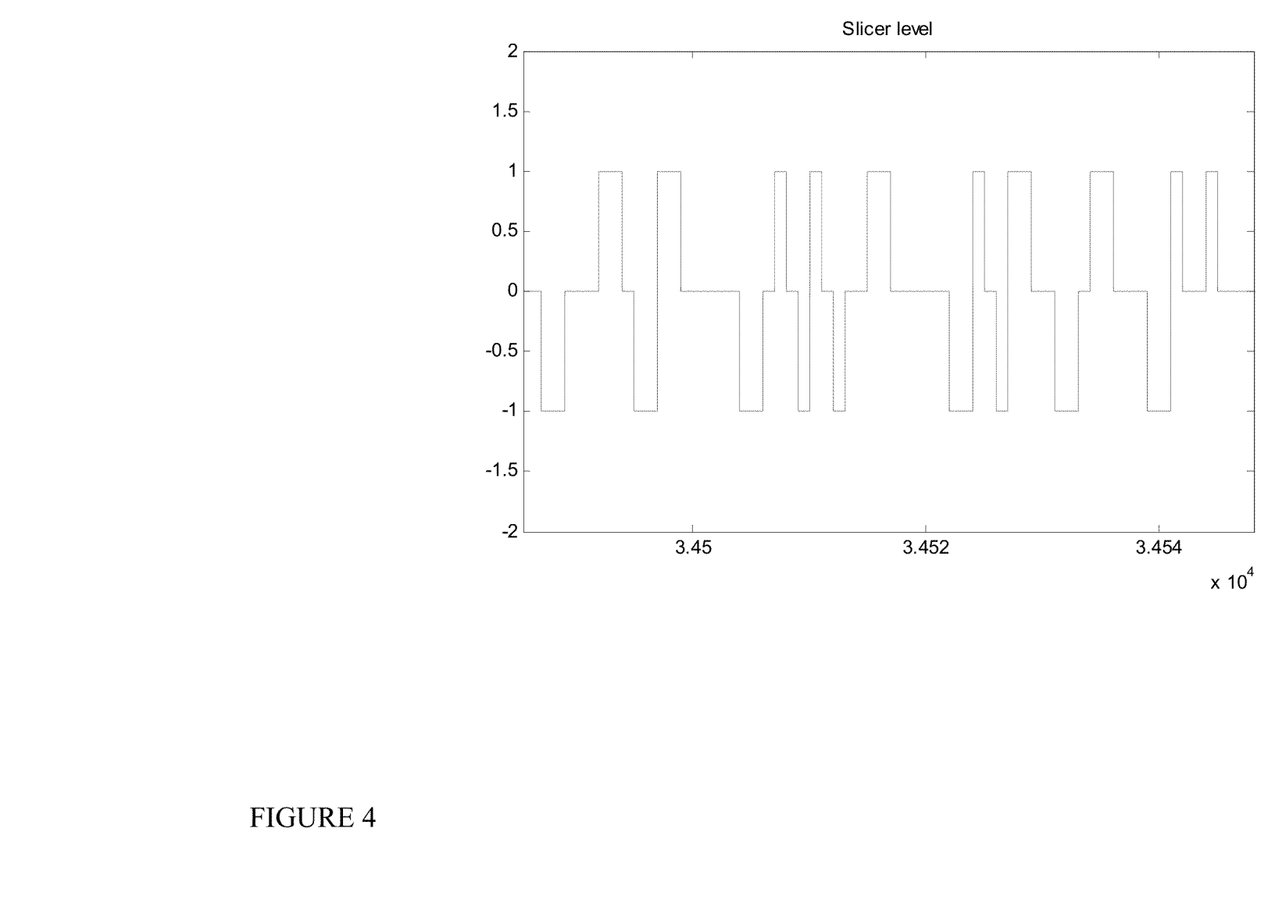
FIG. 4 illustrates an example slicer output.

Consequently, the succession of slicer output "$\hat{\chi}_k$" is divided into three fixed levels, where the central level is always zero and the other two levels have equal but opposite signs. FIG. 4 illustrates the result of slicing the samples of FIG. 3, showing the estimated levels, which, in this case, have been reduced to the range $\{+1, 0, -1\}$.

Following slicer 133, phase detector 134 determines the difference between "$\chi_k$" and "$\hat{\chi}_k$" and produces an error signal, which, after passing through low-pass loop filter 135, is applied to NCO 132 to determine the next value of "$\mu_k$" (e.g., to be used with the next signal sample). In some implementations, phase detector 134 selects an optimal point based on the interpolator output and the slicer output of the current sample and the previous sample as the following:

$$\chi_k \times \hat{\chi}_{k-1} - \chi_{k-1} \times \hat{\chi}_k; \quad (3)$$

where: "$\chi_k$" is the interpolator output for the current sample; "$\hat{\chi}_k$" is the slicer output for the current sample; "$\chi_{k-1}$" is the interpolator output for the previous sample; and "$\hat{\chi}_{k-1}$" is the slicer output for the previous sample. The optimal point is used to determine the output of interpolated timing recovery unit 130.

NCO 132 may be a digital signal generator that creates a synchronous, discrete-time, discrete-valued representation of a waveform, usually sinusoidal. In some implementations, NCO 132 smoothes out the output received from loop filter 135. There are two coefficients involved with NCO 132 and loop filter 135: "$k_p$" is the proportional coefficient and "$k_i$" is the integral coefficient. NCO 132 may choose the values for "$k_p$" and "$k_i$" to optimize the signal output.

Finally, "$\chi_k$" and "$\hat{\chi}_k$" exit interpolated timing recovery unit 130 and may be subjected to further processing.

In FIG. 1, preprocessor 110 is a fixed preprocessor. That is, preprocessor 110 is not dynamically adapted for different input samples "$\gamma_i$" and does not correct different input samples "$\gamma_i$" differently. EQUATION (1) is capable of correcting the asymmetrical saturation only. On the other hand, improved SNRs may be obtained by means of EQUATION (2), which corrects both the asymmetrical and the symmetrical saturation. Further improvement on SNRs may be expected when the distributions of the "$\chi_k$" are centered about the "$\hat{\chi}_k$". While it may be possible to center the distributions by repetitive adjustments to the "$\alpha$", "$\beta$", and "$\delta$" terms, this approach is problematical since every term affects the others but in different ways.

In particular embodiments, three auxiliary variables, "$K_{pos}$", "$K_{neg}$", and "$K_{zer}$", are defined as following:

$$\alpha = \frac{K_{pos} + K_{neg}}{2}; \quad (4)$$

$$\beta = \frac{K_{pos} - K_{neg}}{2}; \text{ and} \quad (5)$$

$$\delta = K_{zer}. \quad (6)$$

From EQUATIONS (4) and (5), it may be derived that:

$$K_{pos} = \alpha + \beta; \text{ and} \quad (7)$$

$$K_{neg} = \alpha - \beta. \quad (8)$$

Substituting the "$\alpha$", "$\beta$", and "$\delta$" terms in EQUATION (2) with "$K_{pos}$", "$K_{neg}$", and "$K_{zer}$" as defined in EQUATIONS (4), (5), and (6), EQUATION (2) may be rewritten as:

$$y_o = y_i + \left(\frac{K_{pos} + K_{neg}}{2}\right)(y_i)^2 + \left(\frac{K_{pos} - K_{neg}}{2}\right)(y_i)^2 |y_i| + K_{zer}. \quad (9)$$

Therefore:

$$y_o = y_i + K_{pos}(y_i)^2 + K_{zer}, \text{ if } y_i > 0; \text{ and} \quad (10)$$

$$y_o = y_i + K_{neg}(y_i)^2 + K_{zer}, \text{ otherwise.} \quad (11)$$

Figure 5:
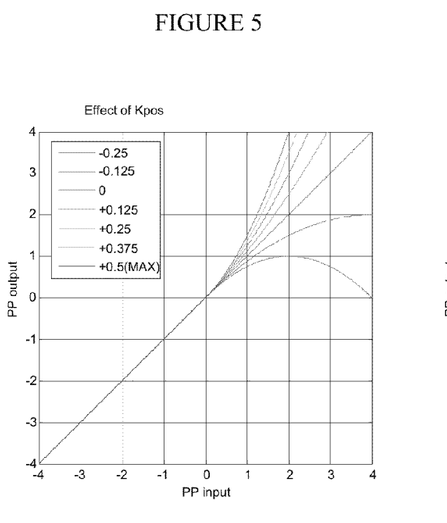
FIGS. 5-7 illustrate the effects of the three "k" values used with an adaptive compensator.
Figure 6:
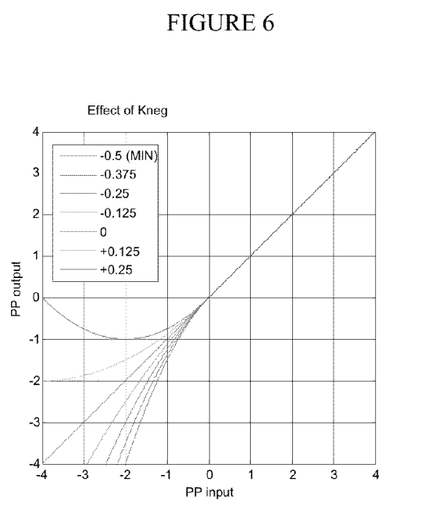
Figure 7:
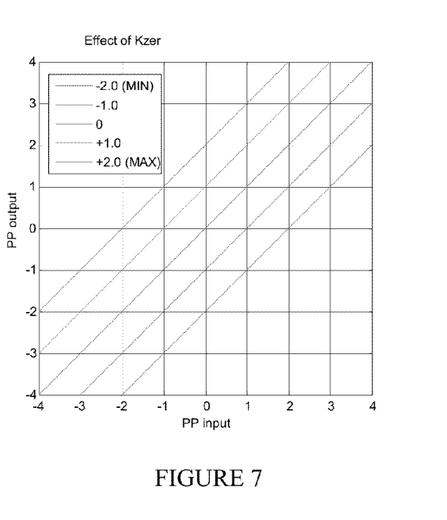

FIGS. 5-7 illustrate the effects of "$K_{pos}$", "$K_{neg}$", and "$K_{zer}$", respectively, on the preprocessor output at various values. From FIG. 5, it may be seen that "$K_{pos}$" changes the slope of the positive level only. From FIG. 6, it may be seen that "$K_{neg}$" changes the slope of the negative level only. From FIG. 7, it may be seen that "$K_{zer}$" serves to shift all three levels uniformly up or down without changing the shape of the transfer function.

In particular embodiments, given the current interpolator output "$\chi_k$" and the current sliced level "$\hat{\chi}_k$", continuous adaptation of the preprocessor may be accomplished by updating the appropriate one of "$K_{pos}$", "$K_{zer}$", and "$K_{neg}$", as following:

$$K_{pos}^{n+1} = K_{pos}^{n} - \mu_a \cdot (\chi_k - \hat{\chi}_k), \text{ if } \hat{\chi}_k = +1; \quad (12)$$

$$K_{zer}^{n+1} = K_{zer}^{n} - \mu_b \cdot (\chi_k), \text{ if } \hat{\chi}_k = 0; \text{ and} \quad (13)$$

$$K_{neg}^{n+1} = K_{neg}^{n} - \mu_a \cdot (\chi_k - \hat{\chi}_k), \text{ if } \hat{\chi}_k = -1. \quad (14)$$

where "$\mu_a$" and "$\mu_b$" are positive constants, and usually small positive constants. In some cases, "$\mu_a$" and "$\mu_b$" may have the same value, but it is not necessarily so for all cases. They are used to control the adaptation rates.

In some implementations, the values of "$\mu_a$" and "$\mu_b$" may depend, at least in part, on the characteristics of the magnetic recording systems and the recording medium involved, and may be manually or semi-automatically determined based on experiments. For example, at the beginning, the values of "$\mu_a$" and "$\mu_b$" may be initialized to 0. Then, as the signal samples are obtained from the recording medium, the values of "$\mu_a$" and "$\mu_b$" may be adjusted to improve the output and the performance of the system, especially the read channel. The experiments may be repeated for different types of recording medium or read channels.

According to EQUATIONS (12), (13), and (14), one of "$K_{pos}$", "$K_{zer}$", and "$K_{neg}$" is adjusted depending on the sliced level "$\hat{\chi}_k$" of the current signal sample. More specifically, if the sliced level "$\hat{\chi}_k$" of the current sample (e.g., sample n) is at level "+1", then the current "$K_{pos}^{n}$" is adjusted according to EQUATION (12). The adjusted "$K_{pos}^{n+1}$" is used for the next sample. If the sliced level "$\hat{\chi}_k$" of the current sample is at level "0", then the current "$K_{zer}^{n}$" is adjusted according to EQUATION (13). The adjusted "$K_{zer}^{n+1}$" is used for the next sample. If the sliced level "$\hat{\chi}_k$" of the current sample is at level "−1", then the current "$K_{neg}^{n}$" is adjusted according to EQUATION (14). The adjusted "$K_{neg}^{n+1}$" is used for the next sample. Note that only one of "$K_{pos}$", "$K_{zer}$", and "$K_{neg}$" is adjusted for a signal sample, because the sliced level "$\hat{\chi}_k$" of each sample can only be at one of the three levels. In this manner the "$K_{pos}$", "$K_{neg}$", and "$K_{zer}$" terms asymptotically approach the ideal sliced levels "$\hat{\chi}_k$".

Figure 8:
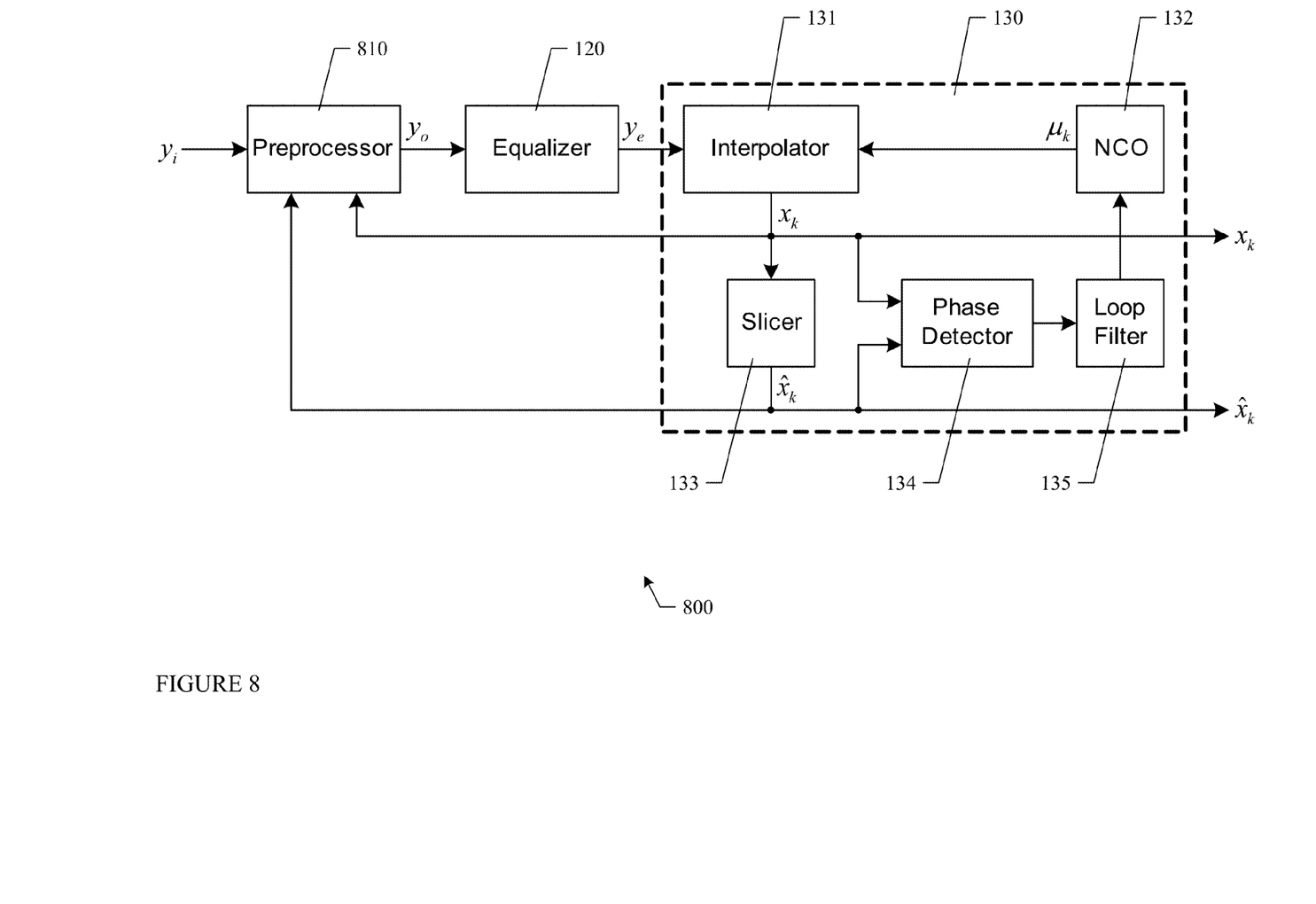
FIG. 8 illustrates an example read channel with an adaptive preprocessor.

FIG. 8 illustrates an example read channel 800 in which a preprocessor 810 is continuously updated according to EQUATIONS (12), (13), and (14). In some implementations, preprocessor 810 contains the circuitry corresponding to EQUATIONS (10) and (11). In particular embodiments, the "$\chi_k$" and "$\hat{\chi}_k$" terms are applied to preprocessor 810 and, employing EQUATIONS (12), (13), and (14), serve to adjust the "$K_{pos}$", "$K_{zer}$", and "$K_{neg}$" terms, which have replaced the "$\alpha$", "$\beta$", and "$\delta$" terms in EQUATION (2) and FIG. 1.

Comparing FIG. 8 with FIG. 1, in FIG. 1, the "$\chi_k$" and "$\hat{\chi}_k$" terms are not applied to preprocessor 110, whereas in FIG. 8, the "$\chi_k$" and "$\hat{\chi}_k$" terms are applied to preprocessor 810. Thus, preprocessor 110 is a fixed preprocessor, whereas preprocessor 810 is an adaptive preprocessor.

In particular embodiments, the adjustment of one of the "$K_{pos}$", "$K_{zer}$", and "$K_{neg}$" terms may be made once every n signal samples. For example, if n=1, then one of the "$K_{pos}$", "$K_{zer}$", and "$K_{neg}$" terms is adjusted every signal sample. If n=2, then one of the "$K_{pos}$", "$K_{zer}$", and "$K_{neg}$" terms is adjusted every other signal sample. And so on.

By substituting "$\alpha$", "$\beta$", and "$\delta$" with "$K_{pos}$", "$K_{zer}$", and "$K_{neg}$", as shown in EQUATION (9), preprocessor 810 is optimized not just at point of manufacture but throughout the product life. It provides for correction of both symmetrical and asymmetrical saturation while eliminating undesirable interaction between the "$\alpha$" and "$\beta$" terms. It also provides for the independent adjustment of the "$\delta$" term. Although the method of correcting both symmetrical and asymmetrical saturation is described mainly in connection with a read channel employed in a magnetic recording device, it is applicable to any type of channel that receives and processes nonlinear signals and is subject to various kinds of head or media wear that can reduce channel SNR over time.

As illustrated in FIG. 8, both interpolator output "$\chi_k$" and slicer output "$\hat{\chi}_k$" are fed back to preprocessor 810 to be used for adjusting the value of "$K_{pos}$", "$K_{zer}$", or "$K_{neg}$". The interpolator output "$\chi_k$" is "soft" data in the sense that its values may vary within a range of different values, as illustrated in FIG. 3. On the other hand, the slicer output "$\hat{\chi}_k$" is "estimated" data as its values can be either −1, 0, or +1, as illustrated in FIG. 4. The difference between the two are determined and used to nudge preprocessor 810 toward the ideal value.

Figure 9:
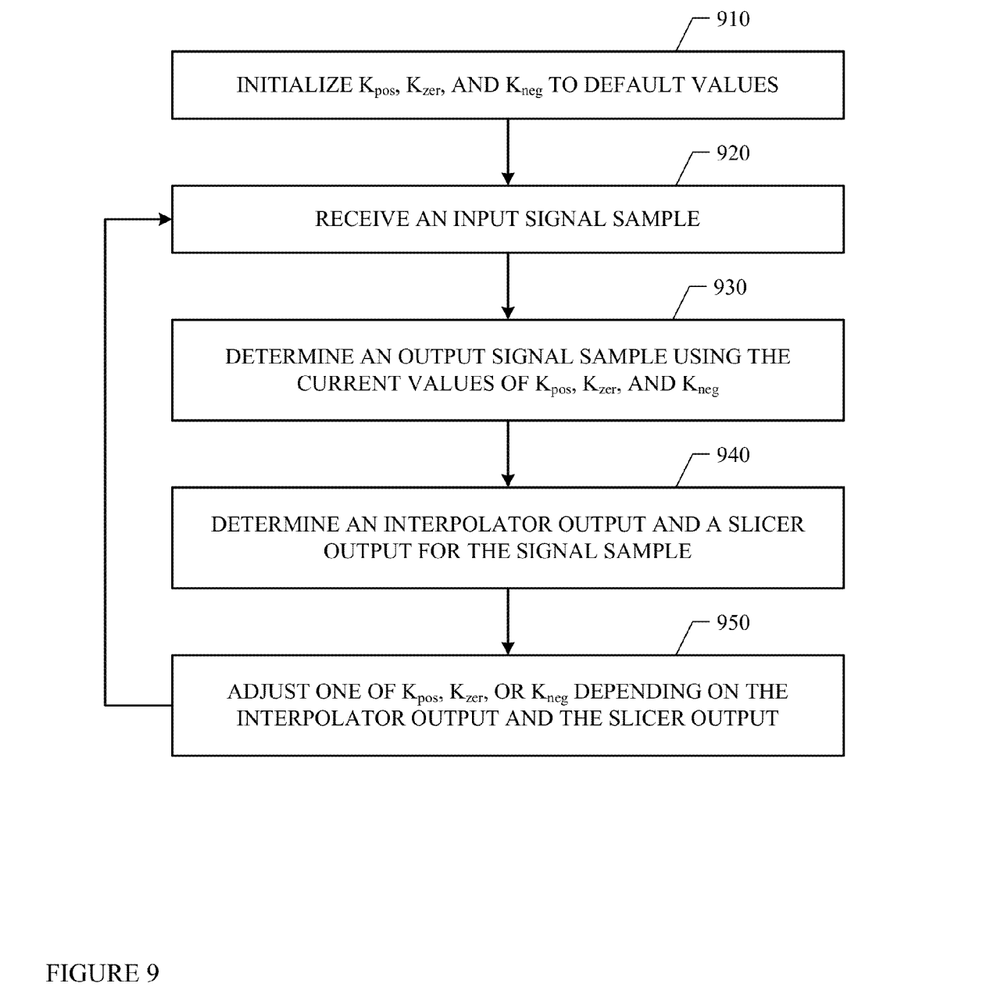
FIG. 9 illustrates an example method for adaptively correcting both symmetrical and asymmetrical saturation in a read channel.

FIG. 9 illustrates an example method for adaptively correcting both symmetrical and asymmetrical saturation in a read channel. In particular embodiments, before reading signals from the recording medium, "$K_{pos}$", "$K_{zer}$", and "$K_{neg}$" are each initialized to a default value, such as 0 (STEP 910). An adaptive preprocessor (e.g., preprocessor 810) receives an input signal sample "$y_i$" from an sampling unit (STEP 920) and produces an output signal sample "$y_o$" according EQUATION (10) or (11) with the current values of "$K_{pos}$", "$K_{zer}$", and "$K_{neg}$" (STEP 930). The output signal sample "$y_o$" is then sent to an interpolated timing recovery unit (e.g., interpolated timing recovery unit 130), which determines an interpolator output "$\chi_k$" and a slicer output "$\hat{\chi}_k$" for the output signal sample "$y_o$" (STEP 940). The interpolator output "$\chi_k$" and the slicer output "$\hat{\chi}_k$" are sent to the adaptive preprocessor as feedback. One of "$K_{pos}$", "$K_{zer}$", and "$K_{neg}$" is adjusted (STEP 950), depending on the level of the slicer output "$\hat{\chi}_k$", according to EQUATION (12), (13), or (14).

STEPS 920, 930, 940, and 950 are repeated as more signals are received from the sampling unit. For example, as the adaptive preprocessor receives a second input signal sample "$\gamma_i$" from the sampling unit, it produces another output signal sample "$\gamma_o$" using the current values of "$K_{pos}$", "$K_{zer}$", and "$K_{neg}$", one of which has been adjusted. This second output signal sample "$\gamma_o$" is then sent to the interpolated timing recovery unit, which determines another interpolator output "$\chi_k$" and another slicer output "$\hat{\chi}_k$" for the second output signal sample "$\gamma_o$". The second interpolator output "$\chi_k$" and the second slicer output "$\hat{\chi}_k$" are sent to the adaptive preprocessor as feedback. One of "$K_{pos}$", "$K_{zer}$", and "$K_{neg}$" is then adjusted. And so on.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A read channel comprising: a preprocessor for receiving a first signal and producing a second signal from the first signal using current values of a positive coefficient, a zero coefficient, and a negative coefficient;
   an interpolator for producing a third signal based on the second signal; and
   a slicer for producing a fourth signal from a third signal by estimating a level for the third signal,
   wherein:
      the fourth signal is at one of three levels consisting of a positive level, a zero level, and a negative level;
      for every n first signals received by the preprocessor, the current value of one of the positive coefficient, the zero coefficient, and the negative coefficient is adjusted depending on which of the three levels the fourth signal is at, and
   wherein the preprocessor produces the second signal from the first signal according to:

$\gamma_o = \gamma_i + K_{pos}(\gamma_i)^2 + K_{zer}$ if $\gamma_i > 0$, and $\gamma_o = \gamma_i + K_{neg}(\gamma_i)^2 + K_{zer}$ otherwise;

where:
      $\gamma_i$ denotes the first signal;
      $\gamma_o$ denotes the second signal;
      $K_{pos}$ denotes the positive coefficient;
      $K_{zer}$ denotes the zero coefficient; and
      $K_{neg}$ denotes the negative coefficient.

2. The read channel of claim 1, wherein the read channel corrects both asymmetrical and symmetrical saturation.

3. The read channel of claim 1, wherein for every n first signals received by the preprocessor:
   if the fourth signal is at the positive level, then the current value of the positive coefficient is adjusted;
   if the fourth signal is at the zero level, then the current value of the zero coefficient is adjusted; and
   if the fourth signal is at the negative level, then the current value of the negative coefficient is adjusted.

4. The read channel of claim 1, wherein n equals 1.

5. The read channel of claim 1, further comprising an equalizer for boosting the second signal and transforming the second signal to a fifth signal,
   wherein the interpolator receives the fifth signal and produces the third signal from the fifth signal.

6. The read channel of claim 1, further comprising a phase detector for producing an error signal using the third signal and the fourth signal.

7. The read channel of claim 1, further comprising:
   a loop filter; and
   a numerically-controlled oscillator.

8. A read channel comprising: a preprocessor for receiving a first signal and producing a second signal from the first signal using current values of a positive coefficient, a zero coefficient, and a negative coefficient;
   an interpolator for producing a third signal based on the second signal; and
   a slicer for producing a fourth signal from a third signal by estimating a level for the third signal,
   wherein:
      the fourth signal is at one of three levels consisting of a positive level, a zero level, and a negative level;
      for every n first signals received by the preprocessor, the current value of one of the positive coefficient, the zero coefficient, and the negative coefficient is adjusted depending on which of the three levels the fourth signal is at, and
   wherein for every n first signals received by the preprocessor, the current value of one of the positive coefficient, the zero coefficient, and the negative coefficient is adjusted according to:

$K_{pos} = K_{pos} - \mu_a \cdot (\chi_k - \hat{\chi}_k)$ if $\hat{\chi}_k = +1$, $K_{zer} = K_{zer} - \mu_b \cdot (\chi_k)$ if $\hat{\chi}_k = 0$, and $K_{neg} = K_{neg} - \mu_a \cdot (\chi_k - \hat{\chi}_k)$ if $\hat{\chi}_k = -1$;

where:
      $K_{pos}$ denotes the positive coefficient;
      $K_{zer}$ denotes the zero coefficient;
      $K_{neg}$ denotes the negative coefficient;
      $\chi_k$ denotes the third signal;
      $\hat{\chi}_k$ denotes the fourth signal; and
      $\mu_a$ and $\mu_b$ are positive constants.

9. A magnetic recording device comprising a read channel comprising:
   a preprocessor for receiving a first signal and producing a second signal from the first signal using current values of a positive coefficient, a zero coefficient, and a negative coefficient;
   an interpolator for producing a third signal based on the second signal; and
   a slicer for producing a fourth signal from the third signal by estimating a level for the third signal, wherein:
the fourth signal is at one of three levels consisting of a positive level, a zero level, and a negative level;
for every n first signals received by the preprocessor, the current value of one of the positive coefficient, the zero coefficient, and the negative coefficient is adjusted depending on which of the three levels the fourth signal is at, and
wherein the preprocessor produces the second signal from the first signal according to:

$$\gamma_o = \gamma_i + K_{pos}(\gamma_i)^2 + K_{zer} \text{ if } \gamma_i > 0, \text{ and}$$

$$\gamma_o = \gamma_i + K_{neg}(\gamma_i)^2 + K_{zer} \text{ otherwise;}$$

where:
$\gamma_i$ denotes the first signal;
$\gamma_o$ denotes the second signal;
$K_{pos}$ denotes the positive coefficient;
$K_{zer}$ denotes the zero coefficient; and
$K_{neg}$ denotes the negative coefficient.

10. A method comprising: for each of a plurality of first signals,
producing, by a preprocessor, a second signal from the first signal current values of a positive coefficient, a zero coefficient, and a negative coefficient;
producing, by an interpolator, a third signal based on the second signal; and
producing, by a slicer, a fourth signal from a third signal by estimating a level for the third signal,
wherein:
the fourth signal is at one of three levels consisting of a positive level, a zero level, and a negative level;
for every n first signals, the current value of one of the positive coefficient, the zero coefficient, and the negative coefficient is adjusted depending on which of the three levels the fourth signal is at, and
wherein the preprocessor produces the second signal from the first signal according to:

$$\gamma_o = \gamma_i + K_{pos}(\gamma_i)^2 + K_{zer} \text{ if } \gamma_i > 0, \text{ and}$$

$$\gamma_o = \gamma_i + K_{neg}(\gamma_i)^2 + K_{zer} \text{ otherwise;}$$

where:
$\gamma_i$ denotes the first signal;
$\gamma_o$ denotes the second signal;
$K_{pos}$ denotes the positive coefficient;
$K_{zer}$ denotes the zero coefficient; and
$K_{neg}$ denotes the negative coefficient.

11. The method of claim 10, wherein for every n first signals:
if the fourth signal is at the positive level, then the current value of the positive coefficient is adjusted;
if the fourth signal is at the zero level, then the current value of the zero coefficient is adjusted; and
if the fourth signal is at the negative level, then the current value of the negative coefficient is adjusted.

12. The method of claim 10, wherein n equals 1.

13. The method of claim 10, further comprising:
boosting, by an equalizer, the second signal; and
transforming, by the equalizer, the second signal to a fifth signal,
wherein the interpolator receives the fifth signal and produces the third signal from the fifth signal.

14. The method of claim 10, further comprising producing, by a phase detector, an error signal using the third signal and the fourth signal.

15. A method comprising: for each of a plurality of first signals,
producing, by a preprocessor, a second signal from the first signal current values of a positive coefficient, a zero coefficient, and a negative coefficient;
producing, by an interpolator, a third signal based on the second signal; and
producing, by a slicer, a fourth signal from a third signal by estimating a level for the third signal,
wherein:
the fourth signal is at one of three levels consisting of a positive level, a zero level, and a negative level;
for every n first signals, the current value of one of the positive coefficient, the zero coefficient, and the negative coefficient is adjusted depending on which of the three levels the fourth signal is at, and
wherein for every n first signals, the current value of one of the positive coefficient, the zero coefficient, and the negative coefficient is adjusted according to:

$$K_{pos} = K_{pos} - \mu_a \cdot (\chi_k - \hat{\chi}_k) \text{ if } \hat{\chi}_k = +1,$$

$$K_{zer} = K_{zer} - \mu_b \cdot (\chi_k) \text{ if } \hat{\chi}_k = 0, \text{ and}$$

$$K_{neg} = K_{neg} - \mu_a \cdot (\chi_k - \hat{\chi}_k) \text{ if } \hat{\chi}_k = -1;$$

where:
$K_{pos}$ denotes the positive coefficient;
$K_{zer}$ denotes the zero coefficient;
$K_{neg}$ denotes the negative coefficient;
$\chi_k$ denotes the third signal;
$\hat{\chi}_k$ denotes the fourth signal; and
$\mu_a$ and $\mu_b$ are positive constants.

* * * * *